(12) United States Patent
Staroselsky et al.

(10) Patent No.: US 10,428,825 B2
(45) Date of Patent: Oct. 1, 2019

(54) AIRFOIL STRUCTURE HAVING A SHAPE MEMORY ALLOY ACTUATOR

(71) Applicant: United Technologies Corporation, Farmington, CT (US)

(72) Inventors: Alexander Staroselsky, Avon, CT (US); Dmytro Mykolayovych Voytovych, Rocky Hill, CT (US); Eric D. Gray, Glastonbury, CT (US); Sergey Mironets, Charlotte, NC (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 328 days.

(21) Appl. No.: 15/350,649

(22) Filed: Nov. 14, 2016

(65) Prior Publication Data

US 2018/0135635 A1 May 17, 2018

(51) Int. Cl.
*F01D 5/14* (2006.01)
*F04D 27/00* (2006.01)
*F02C 3/04* (2006.01)
*F04D 29/32* (2006.01)
(Continued)

(52) U.S. Cl.
CPC .......... *F04D 27/002* (2013.01); *B22F 3/1115* (2013.01); *B22F 5/009* (2013.01); *B22F 5/04* (2013.01); *C22F 1/006* (2013.01); *F01D 5/16* (2013.01); *F01D 5/28* (2013.01); *F02C 3/04* (2013.01); *F02K 3/06* (2013.01); *F04D 27/001* (2013.01); *F04D 29/325* (2013.01); *F04D 29/384* (2013.01); *F04D 29/668* (2013.01); *B22F 2005/004* (2013.01); *B33Y 80/00* (2014.12); *F01D 25/06* (2013.01);
(Continued)

(58) Field of Classification Search
CPC . F01D 5/16; F01D 5/28; F04D 29/388; F04D 29/668; F05D 2260/96; F05D 2300/505
See application file for complete search history.

(56) References Cited

U.S. PATENT DOCUMENTS 4,859,141 A 8/1989 Maisch et al.
5,440,193 A * 8/1995 Barrett .................... B64C 13/50
156/291

(Continued)

FOREIGN PATENT DOCUMENTS

CN 102400718 A 4/2012
EP 3214268 A1 9/2017
(Continued)

OTHER PUBLICATIONS

European Search Report for EP Application No. 17201688.3 dated Feb. 21, 2018, 12 pages.

*Primary Examiner* — Ninh H. Nguyen
(74) *Attorney, Agent, or Firm* — Cantor Colburn LLP

(57) ABSTRACT

A fan blade includes a blade body and a shape memory alloy actuator. The blade body has a pressure side disposed opposite a suction side. Each of the pressure side and the suction side extends radially from a root towards a tip and extends axially from a leading edge towards a trailing edge. The blade body defines a passageway that is disposed between the pressure side and the suction side. The shape memory alloy actuator is received within the passageway and is operatively connected to the blade body.

14 Claims, 2 Drawing Sheets

(51) Int. Cl.
| | |
|---|---|
| *F04D 29/38* | (2006.01) |
| *F04D 29/66* | (2006.01) |
| *F02K 3/06* | (2006.01) |
| *F01D 5/28* | (2006.01) |
| *B22F 3/11* | (2006.01) |
| *B22F 5/00* | (2006.01) |
| *B22F 5/04* | (2006.01) |
| *C22F 1/00* | (2006.01) |
| *F01D 5/16* | (2006.01) |
| *F01D 25/06* | (2006.01) |
| *B33Y 80/00* | (2015.01) |

(52) U.S. Cl.
CPC .......... *F04D 29/324* (2013.01); *F04D 29/328* (2013.01); *F04D 29/388* (2013.01); *F04D 29/665* (2013.01); *F04D 29/666* (2013.01); *F05D 2220/36* (2013.01); *F05D 2230/30* (2013.01); *F05D 2250/28* (2013.01); *F05D 2250/283* (2013.01); *F05D 2260/96* (2013.01); *F05D 2260/961* (2013.01); *F05D 2260/962* (2013.01); *F05D 2270/80* (2013.01); *F05D 2300/505* (2013.01); *F05D 2300/601* (2013.01); *F05D 2300/61* (2013.01); *F05D 2300/612* (2013.01); *F05D 2300/613* (2013.01)

(56) References Cited

U.S. PATENT DOCUMENTS

| | | | |
|---|---|---|---|
| 6,669,444 B2 * | 12/2003 | Alacqua | F04D 29/368 416/132 A |
| 7,101,237 B1 * | 9/2006 | Dai | B63B 9/001 416/23 |
| 8,033,789 B2 * | 10/2011 | Read | F01D 5/26 416/230 |
| 8,092,188 B2 * | 1/2012 | Rosati | F04D 29/368 29/889.71 |
| 2002/0131859 A1 | 9/2002 | Alacqua et al. | |
| 2011/0008643 A1 * | 1/2011 | Shaw | B23K 1/0008 428/592 |
| 2012/0045318 A1 | 2/2012 | Lamaster et al. | |
| 2015/0144256 A1 | 5/2015 | Fabre et al. | |
| 2017/0254208 A1 * | 9/2017 | Prince | B29C 35/02 |

FOREIGN PATENT DOCUMENTS

| | | | | |
|---|---|---|---|---|
| GB | 2438185 A | | 11/2007 | |
| GB | 2490127 A | * | 10/2012 | ............ F01D 5/147 |
| GB | 2490127 A | | 10/2012 | |
| WO | 2014105113 A1 | | 7/2014 | |

* cited by examiner

AIRFOIL STRUCTURE HAVING A SHAPE MEMORY ALLOY ACTUATOR

BACKGROUND

Gas turbine engines are provided with fan blades and rotor disks. The fan blades may experience vibrations that increase fatigue. The growing amplitude of vibrations can be a result of an aeromechanical instability that is referred to as flutter. The fan blades are designed to have a positive aero damping, which depends on flow conditions, mode frequency, and nodal diameters. Two methods are traditionally used to increase aerodynamic damping. First, the fan blade is shaped to control the aerodynamic loading. For example, the tip blade loading may be minimized by reducing the incidence angle near the blade tip and increasing the loading away from OD. Second, the blade external geometry is modified to tune natural frequency and mode-shape, such as modifying blade thickness, leading and trailing edge thicknesses, attachment shape, and changing the chord length. Sometimes structural changes may be applied to alternating fan blades or installing fan blades in a pattern around the rotor disk in order to mistune the rotor. This intentional mistuning can be used as a tool to reduce the amplitude of vibration in the fan blades.

Accordingly, it is desirable to change blade frequency to achieve mistuning to reduce the amplitude of vibration in the fan blades.

BRIEF DESCRIPTION

According to an embodiment of the present disclosure, a fan blade for a gas turbine engine is provided. The fan blade includes a blade body and a shape memory alloy actuator. The blade body has a pressure side disposed opposite a suction side. Each of the pressure side and the suction side extends radially from a root towards a tip and extends axially from a leading edge towards a trailing edge. The blade body defines a passageway that is disposed between the pressure side and the suction side. The shape memory alloy actuator is received within the passageway and is operatively connected to the blade body.

In addition to one or more of the features described above, or as an alternative, the passageway extends radially between the root and the tip of the blade body.

In addition to one or more of the features described above, or as an alternative, the shape memory alloy actuator has a first end that is operatively connected to an internal surface of the blade body that is disposed proximate the tip and a second end that is operatively connected to an internal surface of the blade body that is disposed proximate the root.

In addition to one or more of the features described above, or as an alternative, the shape memory alloy actuator is arranged to apply a load to the blade body, in response to an operational parameter exceeding a threshold.

In addition to one or more of the features described above, or as an alternative, the operational parameter is at least one of a vibration imposed on the blade body.

According to another embodiment of the present disclosure, a fan blade for a gas turbine engine is provided. The fan blade includes a cellular structure that extends radially from a root towards a tip and extends axially from a leading edge towards a trailing edge. The cellular structure defines a blade body. The cellular structure has a first portion that defines a shape memory alloy actuator that is disposed between the leading edge and the trailing edge and extends from the root towards the tip.

In addition to one or more of the features described above, or as an alternative, the cellular structure has a second portion that is disposed adjacent to the first portion.

In addition to one or more of the features described above, or as an alternative, the first portion is made using an additive manufacturing process.

In addition to one or more of the features described above, or as an alternative, the second portion is made using an additive manufacturing process.

In addition to one or more of the features described above, or as an alternative, the shape memory alloy actuator is arranged to apply a load to the blade body, in response to an operational parameter exceeding a threshold.

According to yet another embodiment of the present disclosure, a gas turbine engine is provided. The gas turbine engine includes a fan section, a compressor section disposed adjacent to the fan section, a turbine section disposed adjacent to the combustor section, and a fan blade. The fan blade is incorporated into a rotor provided with at least one of the fan section and the compressor section. The fan blade includes a blade body, a shape memory alloy actuator, and a sensor assembly. The blade body has a pressure side disposed opposite a suction side. The shape memory alloy actuator is operatively connected to the blade body. The sensor assembly is in communication with the shape memory alloy actuator. The sensor assembly is arranged to provide a signal indicative of vibration of the fan blade.

In addition to one or more of the features described above, or as an alternative, the shape memory alloy actuator is arranged to apply a load to the blade body, in response to the signal.

In addition to one or more of the features described above, or as an alternative, the shape memory alloy actuator extends between a root of the blade body and a tip of the blade body.

In addition to one or more of the features described above, or as an alternative, the shape memory alloy actuator is spaced apart from the tip of the blade body.

In addition to one or more of the features described above, or as an alternative, the shape memory alloy actuator is disposed between a leading edge of the blade body and a trailing edge of the blade body.

In addition to one or more of the features described above, or as an alternative, the sensor assembly includes a vibratory sensor that is disposed proximate the fan blade.

In addition to one or more of the features described above, or as an alternative, the blade body defines a passageway disposed between the pressure side and the suction side.

In addition to one or more of the features described above, or as an alternative, the shape memory alloy actuator is disposed within the passageway.

In addition to one or more of the features described above, or as an alternative, the shape memory alloy actuator is embedded into the blade body.

In addition to one or more of the features described above, or as an alternative, the shape memory alloy actuator is embedded into at least one of the pressure side and the suction side of the blade body by an additive manufacturing process.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
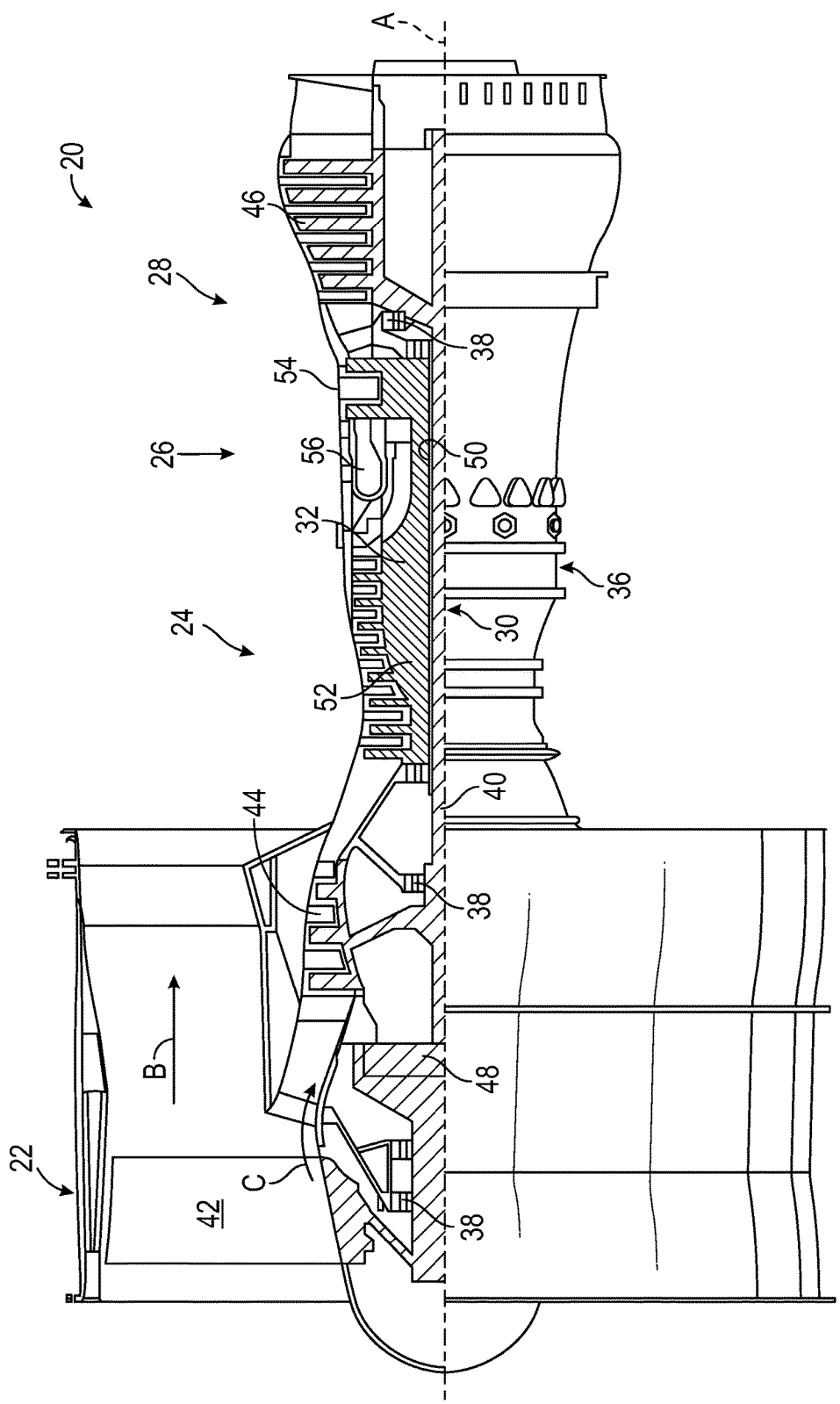
FIG. 1 is a schematic illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines may include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44, and a low pressure turbine 46. The inner shaft 40 is connected to the fan 42 through a speed change mechanism, which is illustrated as a gear system 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Figure 2:
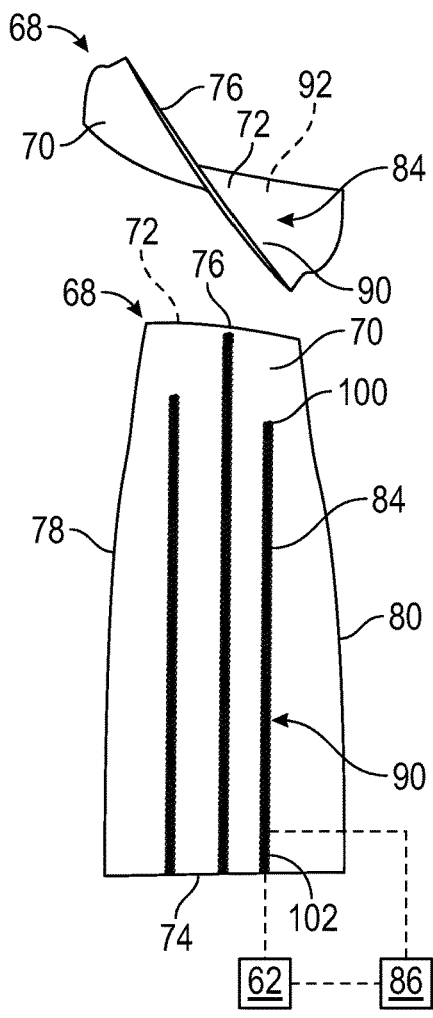
FIG. 2 is a partial perspective view of a fan blade of the gas turbine engine.
Figure 3:
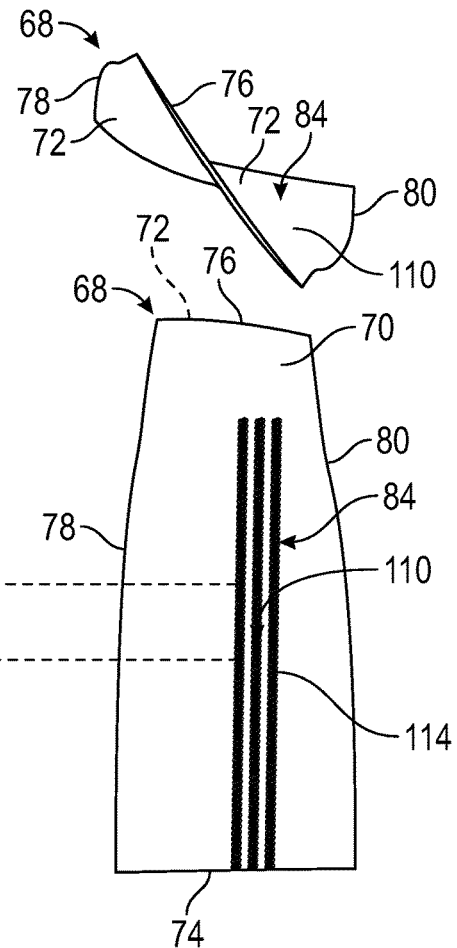
FIG. 3 is a partial perspective view of a fan blade of the gas turbine engine.
Figure 4:
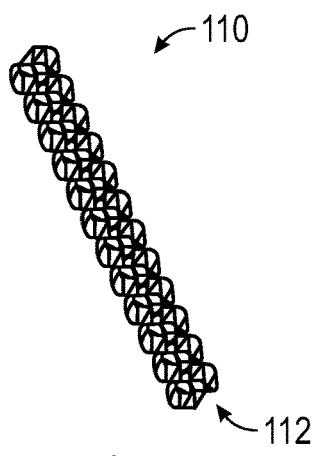
FIG. 4 is a sectional view of a portion of a cellular structure of a shape memory alloy actuator of the fan blade of FIG. 3.

The gas turbine engine 20 also includes a fan blade 60 and a sensor assembly 62. Referring to FIGS. 2-4, the fan blade 60 may be incorporated into at least one of the fan section 22, the compressor section 24, and the turbine section 28. The fan blade 60 may be incorporated into a rotating component such as a rotor that is provided with at least one of the fan section 22, the compressor section 24, and the turbine section 28. The fan blade 60 may be circumferentially disposed about the axis A.

The fan blade 60 includes a blade body 68 having a pressure side 70, a suction side 72, a root 74, a tip 76, a leading edge 78, and a trailing edge 80. The pressure side 70 is disposed opposite the suction side 72. The pressure side 70 is configured as a concave surface. The suction side 72 is configured as a convex surface. The pressure side 70 and the suction side 72 extend radially from the root 74 towards the tip 76. The pressure side 70 and the suction side 72 extend axially between the leading edge 78 and the trailing edge 80.

The fan blade 60 may experience self-exciting vibration due to aerodynamic loading as the fan blade extracts energy from airflow that flows through the gas turbine engine 20. The self-exciting vibration of the fan blade 60 may lead to aeromechanical instability, e.g. flutter, that may lead to increased fatigue. The fan blade 60 may be provided with a shape memory alloy actuator 84 to change the fan blade frequency to achieve mistuning. The shape memory alloy actuator 84 is operatively connected to the blade body 68 and is arranged to preload the fan blade 60 in either tension or compression. The compressive load applied by the shape memory alloy actuator 84 may be applied while vibration of the fan blade 60 exceeds a chosen limiting value or other predefined criterion.

The shape memory alloy actuator 84 may be disposed within or on the blade body 68 anywhere additional vibration damping may be required. The shape memory alloy actuator 84 extends between the root 74 of the blade body 68 towards the tip 76 of the blade body 68. In at least one embodiment, the shape memory alloy actuator 84 is spaced apart from the tip 76 of the blade body 68. The shape memory alloy actuator 84 is disposed between the leading edge 78 of the blade body 68 and the trailing edge 80 of the blade body 68.

The shape memory alloy actuator 84 is made of a shape memory alloy that may be trained to respond when the shape memory alloy experiences a change in polarity or a change in temperature due to the application of electrical current or a thermal load. The shape memory alloy may be made of copper-aluminum-nickel alloys, nickel-titanium alloys, or other alloys including zinc, copper, gold, iron, or the like.

The shape memory alloy includes large recoverable strains (up to 8% with little or no force generated) and high generated stresses up to 700 MPa (101 KSI) with little or no recoverable strain until reverse transformation is induced. The shape memory effect of the shape memory alloy is attributed to the martensitic transformation of the shape memory alloy. The shape memory alloy exhibits different yielding behavior while the shape memory alloy is in a martensitic state or an austenitic state due to its pseudo elastic capabilities attributed to reversible phase change from austenitic to a self-oriented martensitic or stress induced martensitic. The change in the stress and/or strain of the shape memory alloy caused by the change in polarity or temperature, changes the shape of the shape memory alloy actuator 84. The shape memory alloy may be deformed in a low temperature phase and may recover or change shape upon heating to a so-called reverse transformation temperature.

The shape memory alloy may be trained or treated such that the shape memory alloy is stable within or operational within a temperature range of −73° C. to 116° C. (−100° F. to +240° F.), such that a change in position or shape occurs within a temperature range of 400° C. to 600° C. (750° F. to 1112° F.). The change in polarity or the change in temperature causes the shape memory alloy actuator 84 to move between a contracted position and a relaxed position. The contracted position of the shape memory alloy actuator 84 applies a compressive load to the blade body 68. The relaxed position of the shape memory alloy actuator 84 may not apply a compressive load to the blade body 68.

The shape memory alloy actuator 84 may be selectively electrically driven by an electrical actuator that is operatively connected to a power system 86 and is in communication with the sensor assembly 62. The power system 86 is configured to provide an electrical current or electrical power to the shape memory alloy actuator 84 to provide a thermal load or to heat the shape memory alloy actuator 84 to change the state of the shape memory alloy between the martensitic state or the austenitic state in response to the sensor assembly 62 providing a signal indicative of an operational parameter exceeding a predetermined threshold. The provision of electrical current or power moves the shape memory alloy actuator 84 between the relaxed position and the contracted position to achieve mistuning of the fan blade 60. In at least one embodiment, the power system 86 may provide or activate an electro-magnetic field to heat the shape memory alloy actuator 84.

Referring to FIG. 2, the blade body 68 defines a passageway 90. The passageway 90 may be disposed between the pressure side 70 and the suction side 72. The passageway 90 extends radially between the root 74 and the tip 76. The passageway 90 is disposed proximate the pressure side 70 such that an internal surface 92 of the blade body 68 that at least partially defines the passageway 90 is disposed immediately adjacent to at least one of the pressure side 70 and the suction side 72. The shape of the passageway 90 may vary based on the mode shape frequency of the fan blade 60.

Referring to FIG. 2, the shape memory alloy actuator 84 may be a wire bundle, a thin rod, a helix structure, or a cellular structure that is disposed within the passageway 90. The shape memory alloy actuator 84 may be in sliding contact within the passageway 90. The shape memory alloy actuator 84 extends between a first end 100 and a second end 102. The first end 100 is operatively connected to the internal surface 92 of the blade body 68. The first end 100 is disposed proximate the tip 76 of the blade body 68. The second end 102 is operatively connected to the internal surface 92 of the blade body 68. The second end 102 is disposed proximate the root 74 of the blade body 68.

Referring to FIGS. 3 and 4, the blade body 68 of the fan blade 60 may be at least partially defined by a cellular structure 110. The cellular structure 110 may be a micro lattice hybrid composite structure, a helix structure, or a cellular structure formed or manufactured by an additive manufacturing technologies. The additive manufacturing technologies that may be employed include a direct laser metal sintering process, an electron-beam melting process, laser powder bed fusion process, and direct energy deposition process. For example, powder bed fusion additive manufacturing technologies are capable of producing complex cellular structures and laser powder deposition additive manufacturing technologies are capable of depositing multiple materials in a layer by layer fashion. The cellular structure configuration and the density of the cellular structure 110 for the specific blade internal passageway 90 configuration may be optimized by utilizing additive manufacturing technologies. The cellular structure 110 may be bonded at ends to the passageway 90.

The cellular structure 110 configuration may be changed by applying heating or magnetic field to preload the fan blade 60. Heating may be generated through the activation of the electro-magnetic field by the power system 86. Power may be applied directly to the cellular structure 110 of the shape memory alloy actuator 84 or by induction via the power system 86. Induction may be activated by the sensor assembly 62 that generates signals while vibration of the fan blade 60 exceeds a chosen limiting value or under other pre-defined criterion. With the induction activated, the cellular structure 110 of the shape memory alloy actuator 84 will reach the transformation temperature and the cellular structure 110 will contract applying a compressive load to the blade body 68 of the fan blade 60, resulting in a change in the stiffness of the fan blade 60. The natural frequencies of the fan blade 60 may be altered by the preloading of the blade body 68 by the shape memory alloy actuator 84. The internal friction occurring within the shape memory alloy actuator 84 during transformation and in the martensitic state leads to very high damping capability of the shape memory alloy actuator structure. For example, the maximum frequency change of the blade body 68 of the fan blade 60 for mode 3 may be changed by 43%, for mode 1 may be changed by 8%, and mode 2 may be changed by 5%. As soon as need for the pre-loading is gone, e.g. vibration of the fan blade 60 no longer exceeds the chosen limiting value or the other pre-defined criterion, the induction is deactivated and the inverse transformation takes place relaxing the shape memory alloy actuator 84 to no longer apply the compressive load.

In at least one embodiment, the cellular structure 110 of the shape memory alloy actuator 84 may apply non-homogeneous loading to the blade body 68 of the fan blade 60. The cellular structure 110 of the shape memory alloy actuator 84 may be printed or formed having variable cell spacing and a variable wall thickness. The variable cell spacing and the variable wall thickness of cellular structure 110 may enable the blade body 68 of the fan blade 60 to be preloaded in specific locations, e.g. locations having a greater density of cells of greater thickness. Upon heating the cellular structure 110 may recover to the original shape generating internal stresses. Using this recovery, tuning of an airfoil natural frequency may be achieved and the geometry of the fan blade 60 may also be changed for improved or optimized for performance.

The cellular structure 110 may include a first portion 112 and a second portion 114. The first portion 112 extends from the root 74 towards the tip 76 of the blade body 68. The first portion 112 is disposed between and is spaced apart from the leading edge 78 and the trailing edge 80 of the blade body 68. The first portion 112 of the cellular structure 110 defines the shape memory alloy actuator 84 such that the shape memory alloy actuator 84 is embedded into the blade body 68. The shape memory alloy actuator 84 is embedded into the pressure side 70 and/or the suction side 72 of the blade body 68 of the fan blade 60. The first portion 112 may be made of a first material that is capable of being used in an additive manufacturing process.

The first portion 112 of the cellular structure 110 is formed by a plurality of radially oriented lattice elements and axially oriented lattice elements. The first portion 112 of the cellular structure 110 may also be formed by transversely oriented lattice elements and angular lattice elements. Each of the lattice elements may have a gradually variable thickness.

The second portion 114 of the cellular structure 110 is disposed adjacent to the first portion 112. The second portion 114 extends between the first portion 112 and the tip 76. The second portion 114 extends between the first portion 112 and at least one of the leading edge 78 and the trailing edge 80.

The second portion 114 may be made of a second material that is different than the first material. The second material may be a material different from the first material. The second material may be a material capable of being used in an additive manufacturing process.

The sensor assembly 62 is in communication with the shape memory alloy actuator 84. The sensor assembly 62 is arranged or positioned to monitor or measure the operational parameter of the gas turbine engine 20. The operational parameter may be a vibration amplitude indicator imposed on the blade body 68 of the fan blade 60 or imposed on a shroud surface that is spaced apart from or disposed above the blade body 68 of the fan blade 60. The vibration may be imposed or induced on the fan blade 60. The sensor assembly 62 is arranged to provide a signal indicative of vibration of the fan blade 60 to the power system 86 and/or a control system that is in communication with the power system 86. The shape memory alloy actuator 84 is arranged to apply a compressive load or a strain load to the blade body 68 in response to the signal indicating a vibration greater than a threshold vibration. The compressive load or strain load alters the geometry of the fan blade 60 and the natural frequency of the fan blade 60. The load applied to the fan blade 60 changes the natural frequency of the fan blade 60 such that the natural frequency is different than the natural frequency imposed on the fan blade 60. The shape memory alloy actuator 84 is arranged to no longer apply the load to the blade body 68 in response to the signal indicating a vibration less than the threshold vibration.

The sensor assembly 62 may be a pressure tab that is disposed on the blade body 68 of the fan blade 60 or is disposed on the shroud surface. The sensor assembly 62 includes a vibratory sensor that is disposed proximate the blade body 68 of the fan blade 60. The vibratory sensor may be a pressure sensor or tab, a displacement sensor, an accelerometer, a strain gauge, a velocity sensor, a proximity probe, or the like.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A fan blade for a gas turbine engine, comprising:
a blade body having:
a pressure side disposed opposite a suction side;
a blade root radially spaced from a blade a tip;
a leading edge axially spaced from a trailing edge;
a plurality of passageways that:
  extend radially between the blade root and the blade tip;
  are disposed between the leading edge and the trailing edge; and
a plurality of a shape memory alloy actuator (SMA) portions that:
  have a cellular structure,
  are received within and have a shape conforming to the respective plurality of passageways;
  are bonded to, and operatively connected to, and in sliding contact with the blade body; and
  are selectively electrically driven to apply a stiffening load by an electrical actuator that is operatively connected to a power system in response to an operational parameter exceeding a threshold.

2. The fan blade of claim 1, wherein the operational parameter is at least one of a vibration imposed on the blade body.

3. A fan blade for a gas turbine engine, comprising:
a blade body that extends radially from a root towards a tip and extends axially from a leading edge towards a trailing edge, the blade body structure having a plurality of of passageways with a respective plurality of shape memory alloy actuator (SMA) portions that are disposed therein, between the leading edge and the trailing edge, and extending radially from the root to the tip, the SMA portions being bonded to the blade body and being selectively electrically driven to apply a stiffening load by an electrical actuator that is operatively connected to a power system in response to an operational parameter exceeding a threshold.

4. The fan blade of claim 3, wherein the SMA portions is made using an additive manufacturing process.

5. A gas turbine engine, comprising:
a fan section;
a compressor section disposed adjacent to the fan section;
a combustor section disposed adjacent to the compressor section;
a turbine section disposed adjacent to the combustor section; and
a fan blade incorporated into a rotor provided with at least one of the fan section and the compressor section, the fan blade comprising:
a blade body having:
a pressure side disposed opposite a suction side;
a blade root radially spaced from a blade tip;
a leading edge axially spaced from a trailing edge,
a plurality of passageways that:
  extend radially between the blade root and the blade tip;
  are disposed between the leading edge and the trailing edge; and
a plurality of a shape memory alloy actuator (SMA) portions that:

have a cellular structure;
are received within and have a shape conforming to the respective plurality of passageways;
are bonded to, and operatively connected to, and in sliding contact with, the blade body, and
are selectively electrically driven to apply a stiffening load by and electrical actuator that is operatively connected to a power system in response to an operational parameter exceeding a threshold; and
a sensor assembly in communication with the SMA portions, the sensor assembly arranged to provide a signal indicative of vibration of the fan blade to the power system; and
wherein the power system is configured to determine whether the operational parameter exceeds the threshold based on the signal.

6. The gas turbine engine of claim 5, wherein the SMA portions are spaced apart from the tip of the blade body.

7. The gas turbine engine of claim 5, wherein the sensor assembly includes a vibratory sensor that is disposed proximate the fan blade.

8. The gas turbine engine of claim 5, wherein the SMA portions are embedded into the blade body.

9. The gas turbine engine of claim 8, wherein the SMA portions are embedded into the blade body by an additive manufacturing process.

10. The gas turbine engine of claim 5, wherein the SMA portions each have a first end that is operatively connected to an internal surface of the blade body proximate the tip and a second end that is operatively connected to the internal surface proximate the root.

11. The gas turbine engine of claim 10, wherein the SMA portions are each defined by a first portion of a cellular structure.

12. The gas turbine engine of claim 11, wherein the cellular structure is made using an additive manufacturing process.

13. The gas turbine engine of claim 12, wherein the cellular structure is formed by a plurality of radially oriented lattice elements and axially oriented lattice elements, each of the lattice elements having a gradually variable thickness.

14. The gas turbine engine of claim 12, wherein the cellular structure is formed by a transversely oriented lattice elements and angular lattice elements, each of the lattice elements having a gradually variable thickness.

* * * * *